Patented May 5, 1953

2,637,748

UNITED STATES PATENT OFFICE 2,637,748

MANUFACTURE OF FLUOROORGANIC COMPOUNDS

Charles B. Miller, Lynbrook, N. Y., assignor to Allied Chemical & Dye Corporation, New York, N. Y., a corporation of New York No Drawing. Application October 2, 1951,
Serial No. 249,403

7 Claims. (Cl. 260—653)

This invention relates to preparation of fluorine-rich organic compounds useful in the refrigerating and propellant fields and as chemical intermediates. The present improvements are directed to processes for manufacture, by disproportionation methods, of aliphatic fluorocompounds rich in fluorine from aliphatic fluorocompound starting materials to lower the fluorine content.

The starting materials of the invention comprise fluoroderivatives of methane which contain not more than one fluorine atom and at least two halogen, e. g. chlorine, atoms other than fluorine, and which may or may not contain a hydrogen atom. Specifically, suitable starting materials are $CCl_3F$ and $CHCl_2F$.

Several processes are known for fluorinating organic compounds. Thus, it has been proposed to employ fluorine, hydrogen fluoride, or metallic fluorides such as mercuric fluoride and antimony trifluoride as fluorinating agents with or without catalysts. It has also been developed that aluminum fluorides of extremely small crystal size, hereinafter more fully described, have the property of catalyzing disproportionation of the starting materials of the invention to form more highly fluorinated methane derivatives containing two or more fluorine atoms, e. g. products such as $CCl_2F_2$ and $CClF_3$.

In connection with production by various commercial methods of certain halofluorocarbons such as $CCl_2F_2$, substantial amounts of $CCl_3F$ are formed as a by-product. In some instances it is desirable to convert such $CCl_3F$ to the more highly fluorinated and presently more valuable $CCl_2F_2$, and the above mentioned aluminum fluoride method for disproportionating $CCl_3F$ is satisfactory for this purpose. However, there are also circumstances in which it is desirable to convert $CCl_3F$ to $CCl_2F_2$ under temperature conditions which may vary over relatively wide temperature ranges, and at the same time produce maximum quantities of $CCl_2F_2$ and minimum quanties of more highly fluorinated material such as $CClF_3$, i. e. to proceed in such a way as to minimize or inhibit formation of fluoroderivatives of methane containing more than two fluorine atoms.

The principal object of the invention is to provide for manufacture of fluoroderivatives of methane containing not more than two fluorine atoms from the starting materials indicated by processes which minimize or inhibit formation of fluoroderivatives of methane containing more than two fluorine atoms and which do not require the use of fluorinating agents which are expensive, difficult to make, and troublesome to use and handle. Another object is provision of completely gas phase methods for preparing two-fluorine-atom derivatives of methane from the starting materials noted by means of easily controlled disproportionation operations made possible by conjunctive use of the particular hereindescribed aluminum fluoride catalysts and a certain inhibiting agent.

Procedure of the invention includes contacting a gaseous material comprising a fluoroderivative of methane containing not more than one fluorine atom and at least two halogen atoms other than fluorine, at elevated temperature, with the hereindescribed aluminum fluoride catalysts. In accordance with the invention, it has been found that when the foregoing contacting operation is carried out in the presence of a small amount of nitric oxide (NO), disproportionation of the starting material to compounds containing more than two fluorine atoms is minimized or inhibited. Hence, general practice of the invention includes contacting a fluoroderivative of methane containing not more than one fluorine atom and at least two halogen atoms other than fluorine, at disproportionation temperature not above about 400° C., with the hereindescribed aluminum fluoride catalysts while maintaining in the reaction zone the presence of NO in amount sufficient to decrease formation of compounds containing more than two fluorine atoms.

The majority of aluminum fluorides known in the art consist of lumps or smaller discrete particles which in turn are composed of $AlF_3$ crystals of relatively large size, i. e. not less than one thousand and usually several thousand Angstrom units radius and above as in the case of commercial types of aluminum fluoride available on the market. However, certain forms of $AlF_3$, when examined even by the highest powered optical microscope, appear to be of non-crystalline or "amorphous" structure. When such "amorphous" aluminum fluorides are examined using X-ray diffraction technique, extremely small, sub-microscope crystals, "crystallites," may be detected. In practice of this invention, such "amorphous" substantially anhydrous aluminum fluorides, having crystals of certain sub-microscopic (crystallite) size, are used in the disproportionate operations outlined above. Enhanced catalytic activity may be noted by use of aluminum fluorides of crystallite size of about 500 Angstrom radius or below and accordingly the advantages of the invention may be realized operating with such catalytic material. As crystallite size decreases below this value, desired catalytic activity increases and particularly suitable aluminum fluorides include those having crystallite size of about 200 Angstrom and below, (as determined by X-ray diffraction technique).

Aluminum fluorides having the indicated crystallite size and catalytic activity are included within the scope of the invention regardless of method of preparation. However, according to a particular embodiment of the invention, improved catalytic material is employed which is prepared by treating aluminum halide other than aluminum fluoride (which halide is preferably in pure form but may suitably be of commercial or technical grades) with preferably excess quantities of inorganic fluorinating agent reactive therewith under conditions such that no liquid water is present in the reacting materials. For example, catalyst may be prepared by treating solid hydrated aluminum halide with gaseous fluorinating agent (said agent being preferably, but not necessarily, anhydrous) at temperature high enough so that the water in the hydrate is volatilized into the gas, e. g. preferably above about 100° C. to 170° C., the maximum temperature for avoiding fusion depending largely upon the degree of hydration of the reactant and the water content, if any, of the fluorinating agent. If desired, anhydrous reagents may be employed, in which case maintenance of particular temperatures during the catalyst preparation reaction is not as critical and said reaction may be carried out with fluorinating agent in the liquid phase. Of the fluorinating agents which may be used for catalyst preparation, boron trifluoride and hydrofluoric acid may be mentioned. Anhydrous hydrofluoric acid is preferred. Anhydrous aluminum chloride is the preferred halide. Catalyst synthesis reaction is believed to proceed as follows:

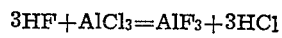

$$3HF + AlCl_3 = AlF_3 + 3HCl$$

HF displaces HCl causing transformation of $AlCl_3$ into $AlF_3$. The remaining aluminum fluoride may be activated by heating in an anhydrous atmosphere at elevated temperature, i. e. temperature at which activation takes place (presumably accompanied by vaporization and removal of any amounts of water of hydration). The finished catalyst is then recovered. Heating the $AlF_3$ in a stream of dry nitrogen or HF gas for about one to four hours at temperatures of about 300–350° C. or four to six hours at 250–300° C. is ordinarily suitable for this purpose. If desired, the catalyst may be activated by heating the $AlF_3$ in a stream of free oxygen-containing gas such as oxygen or air at about 400–600° C. for approximately 30 minutes to eight and one-half hours (depending mostly on the $O_2$ content of the treatment gas), in which case activation with dry nitrogen or HF gas as aforesaid, may be omitted.

Although not essential to realization of the objects of the invention, a suitable and convenient procedure for preparing the aluminum fluoride catalyst is to add solid anhydrous aluminum chloride to an excess of liquefied anhydrous hydrofluoric acid in a cooled container and, after complete addition of the aluminum chloride, mildly to agitate the mixture until reaction is substantially complete. The $AlF_3$ so prepared may be then activated as outlined above. Following is Example A illustrating preparation of $AlF_3$ catalyst according to the latter procedure.

Example A 300 parts by weight of granular (8 to 18 mesh) anhydrous aluminum chloride of commercial grade were added in small portions to liquid anhydrous hydrofluoric acid contained in an externally cooled vessel. A vigorous exothermic reaction took place and additional amounts of hydrofluoric acid were added as needed to maintain an excess thereof. After all the aluminum chloride had been added, the mixture was stirred to promote residual reaction. When reaction of aluminum chloride appeared complete, the mass was mixed and stirred with additional liquid hydrofluoric acid and excess HF was removed by slowly boiling the mixture. 200 parts of anhydrous aluminum fluoride of about 10–40 mesh size having greater than 98% $AlF_3$ content and containing less than 0.15% chlorine were recovered. This $AlF_3$ was heated in a stream of dry inert gas (nitrogen) at a sufficiently elevated temperature (250–300° C.) and a period of time sufficiently long (4–6 hours) to drive off residual amounts of water and activate the material. An X-ray diffraction pattern of material prepared according to the method outlined above, indicated crystallite size to be less than 100 Angstrom units radius, i. e. the crystallite size was so small as to be indicative of "amorphous" structure as desired for the purpose of the present invention. The mesh size distribution of the $AlF_3$ particles did not change appreciably during the latter heat treatment.

As indicated above a particular procedure utilizing HF gas as fluorinating agent for the $AlCl_3$ comprises treating anhydrous $AlCl_3$ or the hydrate with HF gas (preferably anhydrous) at temperature sufficiently high to cause reaction between $AlCl_3$ and HF and to volatilize and maintain any water present in the system in the gas phase (preferably 100–170° C., consistent with avoidance of fusion, in case the hydrate is employed), but low enough to prevent excessive volatilization of $AlCl_3$ (preferably below about 125° C. when anhydrous $AlCl_3$ is treated), and thereafter activating the $AlF_3$ produced. Aluminum fluoride so prepared has also been found to be composed of crystallites of size substantially below 200 Angstrom. Gas phase preparation of catalyst is illustrated by the following example, in which parts expressed are by weight.

Example B 600 parts of 4 to 18 mesh anhydrous aluminum chloride of commercial grade were charged to a nickel reactor and heated therein while passing through the reactor a stream of anhydrous HF gas to bring about the following reaction:

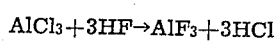

$$AlCl_3 + 3HF \rightarrow AlF_3 + 3HCl$$

The HF was admitted at a sufficiently slow rate to keep the temperature in the reaction zone (exothermic reaction) below about 90° C. to prevent excessive loss of $AlCl_3$ by volatilization. As the reaction neared completion, as evidenced by a sharp decline in reactor temperature, heat was applied externally to the reactor and temperature raised to about 300° C. while still continuing passage of a slow stream of HF through the tube, until last traces of $AlCl_3$ were converted to $AlF_3$. The $AlF_3$ so formed in this particular instance was then activated by heating it in a stream of air at about 450–500° C. for about 30 minutes. The size and shape of the solid material was about the same before and after treatment with gaseous HF. 500 parts of anhydrous aluminum fluoride containing 98–99% $AlF_3$ and less than 0.10% chlorine, were recovered. An X-ray diffraction pattern of the material prepared according to the latter gas phase procedure was made which indicated crystallite size to be in the range 100–200 Angstrom units radius the average being 140 Å., i. e. the crystallite size was so small as to be indicative of "amorphous" structure as desired for fluorination of unsaturated hydrocarbon derivatives according to the present invention.

If desired, the catalyst may be used in the form of a fluidized solid bed or suspended on a non-siliceous inert carrier such as activated alumina, metal fluorides or nickel. Suitable methods for preparing this suspended catalyst include dissolving the aluminum compound in a solvent therefor, applying the solution to the carrier, evaporating the solvent and then treating the aluminum compound impregnated carrier with fluorinating agent. According to an alternative procedure, the aluminum compound, if volatile, may be heated and thereby sublimed into a gas stream and subsequently condensed on the carrier after which it is treated with fluorinating agent as above. Specifically, aluminum chloride may be dissolved in ethyl chloride or an aqueous solvent, then applied to the carrier, and subsequently treated with hydrofluoric acid, or aluminum chloride may be volatilized into a gas stream, condensed on the carrier, and then treated to convert it to aluminum fluoride.

Practice of the invention involves contacting a gaseous material comprising a compound of the group consisting of $CCl_3F$ and $CHCl_2F$, at disproportionation temperature not above 400° C., with the above described aluminum fluoride catalysts having crystallite size below about 500 Angstrom units radius, preferably not substantially greater than and usually below about 200 Angstrom units radius, while in the presence of NO in amount sufficient to decrease, minimize or inhibit formation of products containing more than two fluorine atoms such as $CClF_3$ and $CHF_3$. It has been found that the inhibiting properties of NO are not dependent upon temperature. Hence, temperature may vary widely, and it has been found that satisfactory temperatures may lie in the range of 75–400° C., preferred temperatures lying in the range of 150–350° C. The condensation of liquid material on catalyst has a noted deleterious effect upon its activity and, accordingly, temperatures in all instances should be maintained above the temperature at which any material tends to condense out on the catalyst at the pressure of the system. Pressures may be reduced or elevated, but pressures approximating atmospheric and sufficient to move the gas through the system are satisfactory.

According to a preferred phase of the invention, the initial starting material is $CCl_3F$. As above noted with respect to production of $CCl_2F_2$ by certain commercial methods, substantial amounts of $CCl_3F$ are formed as a by-product, and in some instances it is desirable to convert such $CCl_3F$ to the presently more desirable $CCl_2F_2$. Because of the discovery of the conjunctive relationship and action of the particular catalysts and inhibiting agent described, the invention affords marked commercial advantage by providing a catalytic method for transformation by disproportionation of $CCl_3F$ to $CCl_2F_2$ by procedure which is wholly gas phase, is not restricted to a relatively narrow temperature range for best results and effects formation of a reaction zone exit gas having a high ratio of $CCl_2F_2$ to $CCl_3F$, and a very low ratio of $CClF_3$ to $CCl_2F_2$.

As indicated, the inhibiting agent of the invention is nitric oxide (NO). This gas may be metered into the reaction zone, along with the organic compound starting material, by any suitable means. Quantities of NO employed may vary from any small amount, sufficient to significantly reduce the amount of three-fluorine-atom compound which would otherwise be produced, up to a total of not substantially in excess of 5% by weight of the organic compound starting material. The NO is preferably used in the substantially pure form in amounts in the range of 1–5% by weight of the organic compound input. The NO may be supplied to the process in the form of methyl or ethyl nitrite, or nitro ethane, or any similar material which at the temperature of the reaction breaks down to yield NO and which does not adversely affect the reaction or create reaction zone exit gas handling problems.

There is no critical maximum time of contact of the organic reactant with aluminum fluoride catalyst and the inhibiting agent. At long contact times, however, the capacity of the reactor is low, and an economic disadvantage inheres in the operation. On the other hand, if time of contact is too short the reaction or organic compound input to produce the desired product may be incomplete. This results in the appearance of relatively small amounts of sought-for material and relatively large amounts of unreacted $CCl_3F$ in the reaction product. Such unreacted $CCl_3F$ may be recovered from the product and returned to the reaction, but in such operation cost of recovering and recycling unreacted material may amount to an appreciable item. Accordingly, the time of contact employed is determined by balancing the economic advantage of high reactor capacity obtained at short contact times against cost of recovery of unreacted organic compound input. Further, flow of gaseous reactants through the reaction zone is dependent upon variables such as scale of the operation, quantity of catalyst in the reactor, and specific apparatus employed, and optimum rate of flow of reactant and inhibiting agent, and optimum proportion of NO for any given conditions may be determined by a test run.

For convenience, atmospheric pressure operation is preferred, but the reaction may, if desired, be carried out at superatmospheric or subatmospheric pressure.

The process of the invention may be suitably carried out by introducing a gas comprising e. g. $CCl_3F$ and the desired quantity of inhibiting agent into a reaction zone containing aluminum fluoride described above and heating said material in the zone at the temperatures heretofore indicated for a time sufficient to convert an appreciable amount of $CCl_3F$ to a compound richer in fluorine, withdrawing gaseous products from the zone and recovering said compound richer in fluorine from the gaseous products. Although not limited to continuous operations, the process of my invention may be advantageously carried out thereby.

The various reaction products may be recovered separately or in admixture from the reaction zone exit gas stream in any suitable manner. The gas discharged from the reactor zone is cooled in a condenser to about 30° C. to condense $CCl_4$ (B. P. 78° C.) and thence passed to a concentrated $H_2SO_4$ scrubber to remove NO, to a soda-lime tower to remove from the gas stream any possible traces of HF, HCl and $Cl_2$, to a $CaCl_2$ tower to remove any possible traces of water, and to a vessel externally cooled with Dry Ice and acetone to condense $CCl_2F_2$ (B. P. minus 29.8° C.), some $CClF_3$ (B. P. minus 81° C.) and any unreacted $CCl_3F$ (B. P. 23.8° C.). In event that appreciable amounts of $CClF_3$ are present in the product, the off-gas from the Dry Ice-acetone cooled condenser may be passed subsequently through a condenser cooled by, e. g. liquid nitrogen to a temperature of about minus 200° C. to condense any $CClF_3$. Individual compounds may be recovered, e. g. by distillation, from the condensates obtained as above. Unreacted $CCl_3F$ recovered may be recycled to subsequent operation.

In the case of use of $CHCl_2F$ as starting material, the reaction product gas may be cooled to prelim'narily condense out $CHCl_3$ (B. P. 61.2° C.), scrubbed with $H_2SO_4$, soda-lime and $CaCl_2$, and then passed into a Dry Ice-acetone cooler to condense $CHClF_2$ (B. P. minus 40.8° C.). If appreciable amounts of $CHF_3$ (B. P. minus 82.2° C.) are present, the gas stream may be run through a liquid nitrogen cooler to condense this material.

The exact mechanisms of the disproportionation of the organic compound input taking place in the practice of the invention are not wholly understood, and the action of the inhibiting agent is not known. It is believed that the aluminum fluoride acts essentially as a catalyst at the temperatures stated since no appreciable amount of aluminum chloride has been found in the reaction zone exit gas. At the temperatures noted, the aluminum fluoride brings about a redistribution of fluorine and the other halogen atoms present to produce aliphatic fluorocompounds richer in fluorine than the original starting material. Operations show that the composition of the aluminum fluoride does not change, and hence it appears that the aluminum fluoride does not act as a fluorinating agent in the usual sense and provides substantially no available fluorine during the course of the reaction. When $CCl_3F$ is employed as starting material, the overall reaction involved appears to be represented by the following equations:

$$2CCl_3F \rightarrow CCl_2F_2 + CCl_4$$

and to some extent $$3CCl_3F \rightarrow CClF_3 + 2CCl_4$$

and when $CHCl_2F$ is used as the starting material, the reaction appears to follow $$2CHCl_2F \rightarrow CHClF_2 + CHCl_3$$

with tendency to form some $CHF_3$. In the reactions, the presence of the NO minimizes or inhibits the formation of the three fluorine atom compounds.

Any suitable chamber or reactor tube constructed of inert material may be employed for carrying out the reaction provided the reaction zone afforded is of sufficient length and cross-sectional area to accommodate the required amount of aluminum fluoride necessary to provide adequate gas contact area, and at the same time afford sufficient free space for passage of the gas mixture at an economical rate of flow. Externally disposed reactor tube heating means such as steam jacket or electrical heaters may be supplied.

The following examples illustrate practice of the invention as applied to use of $CCl_3F$ as starting material, parts and percentages being by weight. In these examples, the disproportionation reactor used consisted of a thirty inch section of 1" I. D. nickel pipe containing 300 cc. of $AlF_3$ prepared by the fluorination of $AlCl_3$. This catalyst was made by procedure substantially the same as in Example B, and before use was heated in a stream of nitrogen at temperature of about 300° C. for about two hours. Prior to use the catalyst was not air treated as mentioned in Example B. The crystallite size of the catalyst averaged about 200 Angstrom units radius. The reactor was electrically jacketed for heating to reaction temperatures. Gaseous $CCl_3F$ material and substantially pure NO flowed through orifice flowmeters, and product gases were scrubbed with $H_2SO_4$, water and caustic, and condensed at minus 78° C., and to handle any $CClF_3$ encountered, an additional condenser maintained at liquid nitrogen temperatures was used.

*Example 1.*—Pure $CCl_3F$ was passed through the catalyst bed at 200° C., and infrared spectrograms of the product gases showed considerable $CClF_3$ to be present. A quantitative run over fifty minutes gave the following results:

$CCl_3F$ charged, 137 parts
Products collected:
    124 parts condensed at minus 78° C.
    14 parts condensed at minus 200° C.

All the condensed products were combined and distilled at atmospheric pressure in a low temperature still with the following results:

| B. P. | Parts | Product | Percent Conversion of $CCl_3F$ Charged |
|---|---|---|---|
| −83 | 12 | $CClF_3$ | 34.8 |
| −30.0 | 32 | $CCl_2F_2$ | 52.0 |
| +24 | 16 | $CCl_3F$ | 12.0 |
| +76 | 78 | $CCl_4$ | |

Product ratios:

$$\frac{CClF_3}{CCl_2F_2} = 0.45$$

$$\frac{CCl_2F_2}{CCl_3F} = 2.1$$

*Example 2.*—Immediately upon completion of Example 1, substantially pure NO at a rate of about 5% by weight on the basis of the $CCl_3F$ charged (7 liters/hour) was fed together with $CCl_3F$ into the reactor which was maintained at about 200° C. Infrared spectrograms showed $CClF_3$ to be completely absent. When the system had stabilized, a quantitative run was made. 167 parts of $CCl_3F$ were fed over a period of one hour conjointly with about 8.4 parts of NO gas, giving an NO concentration of about 5% by weight. The product gases were partially condensed at 0° C., and the resulting non-condensed gases were admixed with a slow stream of oxygen to convert NO to $NO_2$. These gases were then scrubbed with concentrated $H_2SO_4$ to remove $NO_2$, and with caustic to eliminate residual acidity, and with $CaCl_2$ for drying, and condensed at minus 78° C. No non-condensables were observed issuing from this condenser. A total of 117 parts were collected in the 0° C. trap, and 50 parts in the minus 78° C.

trap. Combination and distillation of the products gave the following results:

| B. P. | Parts | Compound | Percent Conversion of $CCl_3F$ Charged |
|---|---|---|---|
| −83 | trace | | |
| −30 | 35 | $CCl_2F_2$ | 48 |
| +24 | 87 | $CCl_3F$ | 52 |
| +76 | 44 | $CCl_4$ | |

*Example 3.*—In other runs using catalysts similar to that of Example 1, infrared spectrograms gave the following results:

| Run No. | Temp., °C. | $CCl_3F$ Rate, mols/hr. | cc. Cat. | NO conc., wt. Percent $CCl_3F$ | Mol $CClF_3/CCl_2F_2$ | Mol $CCl_2F_2/CCl_3F$ |
|---|---|---|---|---|---|---|
| 1 | 200 | 1½ | 300 | none | 0.20 | 3.0. |
| 2 | 200 | 1½ | 300 | 1–2 | 0.00 | 4–5. |
| 3 | 300 | 2–2.5 | 300 | none | 1.45 | 1.5. |
| 4 | 300 | 2–2.5 | 300 | 2.0 | 0.2 | about 10. |
| 5 | 300 | 2–2.5 | 300 | 4.0 | 0.1 | about 20. |

Thus, comparative Examples 1 and 2 show substantially complete elimination of $CClF_3$ formation when using a relatively large amount of NO. Consideration of runs 1 and 2 and of runs 3–5 of Example 3, point up the advantages of the invention with respect to flexibility over a substantial temperature range, flexibility of usable amounts of NO, minimization of $CClF_3$ production, and formation of high $CCl_2F_2/CClF_2$ ratios. Further, experience shows that upon cessation of feed of NO, the characteristics and properties of the catalyst return to normal and are not adversely affected with respect to use in other processes.

I claim:

1. The process for converting $CCl_3F$ to $CCl_2F_2$ which comprises introducing a gaseous material comprising $CCl_3F$ into a reaction zone containing aluminum fluoride catalyst having crystallite size not substantially greater than 200 Angstrom units radius, heating said material in said zone at temperature substantially in the range of 150–350° C. for a time sufficient to convert an appreciable amount of said $CCl_3F$ to $CCl_2F_2$, maintaining in said zone during said heating the presence of NO in amount substantially in the range of 1–5% by weight of said $CCl_3F$, withdrawing gaseous product from said zone, and recovering said $CCl_2F_2$ from said gaseous product.

2. The process of contacting gaseous material comprising a fluoroderivative of methane containing not more than one fluorine atom and at least two halogen atoms other than fluorine, at temperature substantially in the range of 75–400° C., with aluminum fluoride catalyst having crystallite size below about 500 Angstrom units radius, to disproportionate a substantial amount of said derivative to form a two-fluorine-atom compound, said contacting operation being carried out while in the presence of NO in small amount, based on the weight of said derivative, but in amount at least sufficient to significantly reduce the quantity of three-fluorine-atom compound which would be otherwise produced.

3. The process of contacting gaseous material comprising a compound of the group consisting of $CCl_3F$ and $CHCl_2F$, at temperature substantially in the range of 75–400° C., with aluminum fluoride catalyst having crystallite size below about 500 Angstrom units radius, to disproportionate a substantial amount of said compound to form a two-fluorine-atom compound, said contacting operation being carried out while in the presence of NO in amount not substantially in excess of 5% by weight of said compound but at least sufficient to significantly reduce the quantity of three-fluorine-atom compound which would be otherwise produced.

4. The process of contacting gaseous material comprising a compound of the group consisting of $CCl_3F$ and $CHCl_2F$, at temperature substantially in the range of 75–400° C., with aluminum fluoride catalyst having cyrstallite size below about 500 Angstrom units radius, to disproportionate a substantial amount of said compound to form a two-fluorine-atom compound, said contacting operation being carried out while in the presence of NO in amount substantially in the range of 1–5% by weight of said compound.

5. The process of contacting gaseous material comprising a compound of the group consisting of $CCl_3F$ and $CHCl_2F$, at temperature substantially in the range of 75–400° C., with aluminum fluoride catalyst having crystallite size not substantially greater than 200 Angstrom units radius, to disproportionate a substantial amount of said compound to form a two-fluorine-atom compound, said contacting operation being carried out while in the presence of NO in amount substantially in the range of 1–5% by weight of said compound.

6. The process of contacting gaseous material comprising $CCl_3F$ at temperature substantially in the range of 75–400° C., with aluminum fluoride catalyst having crystallite size below about 500 Angstrom units radius, to disproportionate a substantial amount of said $CCl_3F$ to form $CCl_2F_2$, said contacting operation being carried out while in the presence of NO in amount not substantially in excess of 5% by weight of said compound but at least sufficient to significantly reduce the quantity of $CClF_3$ which would be otherwise produced.

7. The process of contacting gaseous material comprising $CCl_3F$ at temperature substantially in the range of 75–350° C. with aluminum fluoride catalyst having crystallite size not substantially greater than 200 Angstrom units radius, to disproportionate a substantial amount of said $CCl_3F$ to form $CCl_2F_2$, said contacting operation being carried out while in the presence of NO in amount substantially in the range of 1–5% by weight of $CCl_3F$.

CHARLES B. MILLER.

References Cited in the file of this patent

UNITED STATES PATENTS

| Number | Name | Date |
|---|---|---|
| 2,478,201 | Miller et al. | Aug. 9, 1949 |
| 2,478,932 | Miller et al. | Aug. 16, 1949 |